United States Patent
Griffin

(10) Patent No.: US 11,272,803 B2
(45) Date of Patent: *Mar. 15, 2022

(54) STEAM COOKING APPARATUS WITH INVERTIBLE INSERT BASKET AND METHOD OF STEAM COOKING USING SAME

(71) Applicant: Wyman Harding Griffin, Flagstaff, AZ (US)

(72) Inventor: Wyman Harding Griffin, Flagstaff, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,594

(22) Filed: Jul. 31, 2020

(65) Prior Publication Data
US 2020/0359823 A1    Nov. 19, 2020

Related U.S. Application Data

(63) Continuation-in-part of application No. 16/035,638, filed on Jul. 15, 2018, now Pat. No. 10,765,250.

(60) Provisional application No. 62/689,895, filed on Jun. 26, 2018.

(51) Int. Cl.
*A47J 27/04* (2006.01)
*A47J 36/22* (2006.01)
*A23L 5/10* (2016.01)

(52) U.S. Cl.
CPC ............... *A47J 27/04* (2013.01); *A47J 36/22* (2013.01); *A23L 5/13* (2016.08); *A47J 2027/043* (2013.01)

(58) Field of Classification Search
CPC ........................................ A23L 5/41

USPC .......... 99/327, 399, 348, 443, 455, 465, 476
See application file for complete search history.

(56) References Cited

U.S. PATENT DOCUMENTS

| | | | |
|---|---|---|---|
| 4,316,447 A | 2/1982 | Foreman | |
| 4,813,368 A * | 3/1989 | Hutter, III | A47J 27/212 116/137 R |
| 5,813,321 A | 9/1998 | Nourgeois | |
| 6,089,143 A * | 7/2000 | Figueroa | A47J 19/04 99/327 |
| 6,269,737 B1 * | 8/2001 | Rigney | A47J 27/04 126/369 |
| 6,314,869 B1 | 11/2001 | Bourgeois, Jr. | |
| 6,526,875 B1 * | 3/2003 | Dzbinski | A47J 27/04 126/369 |
| 6,546,849 B1 * | 4/2003 | Shimazaki | A47J 36/08 210/465 |
| 6,568,314 B1 * | 5/2003 | Stepanova | A47J 36/08 210/464 |

(Continued)

*Primary Examiner* — Nina Bhat
(74) *Attorney, Agent, or Firm* — Invention To Patent Services; Alex Hobson

(57) ABSTRACT

A steam cooking apparatus incorporates a steam cooking vessel for retaining water that is converted to steam. An interior food basket is configured to fit within the steam cooking vessel and retains the food to be steamed and has an insert basket lid that is adjustably coupled with the interior food basket to retain the food therein. The insert basket lid is adjustable in height within the interior food basket to accommodate different amounts of food in the interior food basket. Standoffs may be configured between the interior food basket and the base of the cooking vessel to prevent direct water contact with the food. A vessel lid may have lid aperture adjuster panel that enables changing the open area of apertures in the vessel lid.

20 Claims, 14 Drawing Sheets

(56) References Cited

U.S. PATENT DOCUMENTS

| | | | |
|---|---|---|---|
| 7,109,455 B2* | 9/2006 | Hopkins, Sr. | A47J 36/027 219/734 |
| 7,237,476 B1 | 7/2007 | Bourgeois | |
| D646,525 S * | 10/2011 | Molayem | D7/548 |
| D658,424 S * | 5/2012 | Difante | D7/357 |
| 8,707,859 B2* | 4/2014 | Difante | A47J 36/20 99/403 |
| 10,765,250 B1* | 9/2020 | Griffin | A47J 27/04 |
| 2004/0216620 A1* | 11/2004 | Quiggins | A47J 36/08 99/413 |
| 2009/0049990 A1* | 2/2009 | Schutte | A47J 36/22 99/339 |
| 2010/0136194 A1 | 6/2010 | Schutte | |
| 2011/0168034 A1 | 7/2011 | Mizell | |
| 2012/0174798 A1* | 7/2012 | Kulikowski | A47J 36/18 99/340 |
| 2012/0216683 A1* | 8/2012 | Difante | A47J 27/18 99/352 |
| 2013/0074702 A1* | 3/2013 | Difante | A47J 27/10 99/403 |

\* cited by examiner

STEAM COOKING APPARATUS WITH INVERTIBLE INSERT BASKET AND METHOD OF STEAM COOKING USING SAME

CROSS REFERENCE TO RELATED APPLICATIONS

This application is continuation in part of U.S. patent application Ser. No. 16/035,638, filed on Jul. 15, 2018, which claims the benefit of U.S. Provisional Utility Patent Application No. 62/689,895, filed Jun. 26, 2018; the entirety of both applications are hereby incorporated by reference herein.

BACKGROUND OF THE INVENTION

Field of the Invention

The invention relates to a steam cooking apparatus having an interior food basket that is configured to be inverted within the steam cooking vessel to provide more uniform cooking of the food.

Background

The present invention relates to cooking foods with steam, in particular, vegetables and meats on a stovetop vessel. Vegetable steamers have traditionally been defined as an insert basket that is perforated and fits inside a cooking vessel above boiling water, and a lid is placed onto the cooking vessel which covers the insert basket holding food contents. Eventually, stovetop pressurized pots became popular, and most recently, countertop multi cookers. Although the present invention is not in the realm of pressure and multi-cookers, it is pertinent to mention these latter two as there are a multitude of insert steaming baskets made for such devices which basically resemble wire mesh frying baskets.

Examples of prior insert steam baskets and other food steaming appliances are found in U.S. Pat. Nos. 2,667,117; 4,138,939; 4,316,447; 4,452,132; 4,920,251; 4,953,452; 8,960,081; and 9,572,362 to Millard ET AL, Feld, Foreman, Miller, Whitenack, Tarlow, Beard, and Difante, respectively. These devices and their cooking strategies have commonly inherited drawbacks that never fully accomplish the desired criteria that made steam cooking the favorable choice for cooked vegetables retaining the most nutritional value.

Therefore, it is pertinent to consider the commonly given reasons that made vegetable steaming popular; some of the nutrients are water soluble and leech away in boiling water, and nutrients deplete with high heat. Hence, the above methods for steaming vegetables and other foods have not really fled to far from high heat water boiling, as most pressure and multi cookers generate temperatures of 250-280 degrees of watery vapors, and these same high temperatures are commonly achieved with the stove top cooking vessels that use steaming insert baskets, and food nutrients are quickly being depleted. These high temperatures derive due to the fact that such devices commonly use a lid to control rapid evaporation, but usually with only one or two venting holes for the release of rising vapors, causing pressurization and high heat, and food is partially cooked through the process of convection that does not allow for the utilization of the natural laws of physics, consistent vapor rise, which is a more thorough and quicker cooking method that reduces nutritional depletion.

Another inherit problem with the above cooking methods is that the foods are cooked from the bottom upwards as the steam rises until hampered, due to the venting limitations, and an uneven process since the vegetables aren't able to be flipped, and the bottom portion of the food is overcooked before the top portion reaches desired tenderness, and another reason for excessively depleted nutrients. That at least half of the food cooked during such a process is overcooked is evident from the color of the water in the bottom of the vessel, it is the same color as the food that's overcooked. Food properly steamed will leave only a slight tint in the remaining water. Moreover, a steaming device advertising the versatility to cook meats, would allow for a hamburger patty to be flipped, or turned upside down and allow even cooking on both sides of the patty in traditional manner, and this option for even cooking should also be made available for vegetables. None of the above apparatuses allow for such even cooking.

One of the above mentioned patented devices claims to have steam needles to "brown the top of the foods," but respectively, the drawback is that only the very top of the food is attended to in this manner and most of the food still faces an uneven cooking process. Of the just mentioned process, if the steam could reach every top portion of the foods, then this would mean that super pressurized heat would need to be generated to push the steam downwards, and such super temperatures would be counter-productive due to quicker nutritional loss/

Furthermore, overcooked portions of food occur because of the stove burner being used, as heat may be dis-proportionally dispensed at the bottom of the cooking vessel. Also, the vessel itself may be deformed or made of materials that dis-proportionally spread the heat, and this can be determined if some of the water bubbles are larger than the rest, and the entirety of the bubbles are uneven. These latter three factors contribute to uneven rise of heat vapors inside the vessel, and further overcook portions of the food, and again, further nutritional loss. There thus exists a need for a more even cooking method that also hastens the cooking process.

Steam cooking in the microwave has become a convenient way to quickly prepare steam foods. In many cases, people simply put food in a container with water in the base of the container. Some of the food is boiled rather than steamed.

SUMMARY OF THE INVENTION

The primary object of this invention is to provide users with a simple, inexpensive, and practical steam cooking method to steam cook their foods, particularly vegetables, in a manner where every part and portion is evenly cooked to the desired tenderness, without portions of the foods being overcooked.

A further object of the present invention is to use the natural laws of physics: water consistently flows with the least path of resistance, and so does the consistent rise of water vapors, enabling a quick and thorough steaming process. It is this process that teaches the user to move away from the super-heated steam methods and drawbacks mentioned in the prior arts section.

Another and still further object of this invention is that it can be used as a sterilization tool to clean vegetables and fruits of contaminants before cooking and consumption. These objectives are accomplished with the present invention, which includes an exterior cooking vessel commonly referred to as a pot, a food holding insert basket that fits inside the exterior pot, a perforated lid that fits inside the insert basket and is vertically adjustable, a pedestal that rest on the inside bottom of the exterior cooking pot and used to support the food containing insert basket that will rest on the pedestal and keep the insert basket above the cooking water in the bottom of the pot, and a lid that has a multitude of venting holes across its entirety, and fits on top of the exterior pot. There is also a detached handle to lift insert basket and remove from exterior pot.

The uniqueness of this invention primarily rests with the utilization of the insert baskets and its perforated vertically adjustable lids. When these two components are used together, the insert basket can now be vertically inverted 180 degrees as the food contents remain inside. Finishing the uniqueness of the invention is the lid that fits atop of the exterior pot. This lid has multiple venting holes that controls and sets the pattern or path of the rising vapors from the bottom of the pot upwards.

The perforated lids for these interior insert baskets are made to precisely fit inside the insert baskets and not allow food stuffs to fall out. These vertically adjustable lids are latched into place with a bolt type mechanism directly above and on top of the food, and keeps food exactly in its same position as the insert basket is vertically inverted 180 degrees to further the even cooking process.

An exemplary cooking apparatus includes a vessel lid for the steam cooking vessel, A vessel lid may have multiple venting holes or apertures to allow steam to pass therethrough. These venting holes or apertures may be strategically placed to regulate the consistent rise of heat vapors and provide uniform cooking of food within the interior food basket. The venting apertures may be very small and arranged to evenly distribute uneven heating patterns that perhaps occur inside the cooking vessel because of the stove burner and its distribution of fuel. Basically, vapors rising faster than other sections of the pot are slowed down because of the small size of the venting hole, which forces faster rising vapors to seek the next available path of escape, the next small venting hole, the next path of least resistance. The desired quick and thorough consistent rise of vapors moves unhindered and not forced to move laterally, where the stagnant, pressurized, and ineffective high heat convection process develops. Thus, rising vapors, and lower temperature moisturized heat are evenly distributed at the bottom portion of the cooking pot where the desired consistent heat rise path is initially generated. The desired quick, thorough, arid consistent rise of unhindered upward moving heat allows foods to be cooked at effective temperatures of 195°, well below the 212° boiling point, and the superheat temperatures referenced herein.

An exemplary vessel lid may comprise a lid aperture adjuster panel, that is configured to enable adjustment of the open area for venting through apertures in the vessel lid. A lid aperture adjuster panel may also have apertures and a knob to allow the lid aperture adjuster panel to be rotated with respect to the vessel lid to change the amount of alignment of the vessel lid apertures and the lid aperture adjuster panel apertures.

An exemplary steam cooking apparatus incorporates a steam cooking vessel for retaining water that is converted to steam. An interior food basket is configured to fit within the steam cooking vessel and retains the food to be steamed. The interior food basket has an insert basket lid that is adjustably coupled with the interior food basket to retain the food therein. The insert basket lid is configured to be adjusted in height and retained within the interior food basket by a ratchet retainer to retain different amounts of food.

An exemplary ratchet retainer is configured to secure the insert basket lid in incremental locations along the depth of the interior food basket. The ratchet retainer extends from the inside wall of the steam cooking vessel and has a number of ratchet teeth having a sloped portion and a horizontally extending portion to retain a perimeter or perimeter extension of the rim of the insert basket lid.

The interior food basket may be secured an offset distance from the interior base of the steam cooking vessel to prevent direct water contact with the food. This will ensure that the food is steamed and not boiled. The standoffs may be coupled to the steam cooking vessel, such as being projections from the interior base for the interior food basket to rest on. They may be a molded, integral part of the steam cooking vessel, wherein the steam cooking vessel and the standoff are monolithic. The standoff may be a separate piece that is easily place into the steam cooking vessel prior to placing the interior food basket therein. The standoff, may be coupled to the interior food basket and may extend from the base of the interior food basket and/or from the basket cover. In this way, when the interior food basket is inverted, or flipped upside down, the standoff is already configured to raise the interior food basket up from the base of the steam cooking vessel. An exemplary standoff may be a plurality of projections, or a ring or plurality of rings that extend up an offset height from the base of the steam cooking vessel.

A steam cooking vessel lid may have adjustable steam apertures. An aperture adjustment panel may extend over or under the vessel lid and rotating the apertures adjustment panel may change the amount of steam aperture open area in the lid. The adjustment panel uncover or cover apertures in the lid.

The exemplary steam cooking apparatus of the present invention may be used to steam cook food. Water may be placed into the steam cooking vessel. Food may be placed into the interior food basket. The insert basket lid may then be pushed down into the interior food basket and ratcheted down into a desired position to retain the food. An optional basket cover may be placed on the interior food basket. If the offset is a separate component, it may be placed into the steam cooking vessel prior to placing the interior food basket therein. The vessel lid may be placed on the steam cooking vessel and the entire assembly may be placed in a microwave to heat the water. The water is then converted to steam that passes trough apertures in the base of the interior food basket, through apertures in the insert basket lid and apertures in the basket cover, if place on the interior food basket. The steam may also pass through apertures in the vessel lid and as described herein, these apertures may be adjustable in open area. In some cases, the user may want to have small apertures in the vessel lid and in other cases they may want larger sized openings, or a larger open area.

After a first cooking time, the interior food basket can be flipped or inverted and placed back into the steam cooking vessel. The water may then be heated to produce steam for a second cooking time. This food will be cooked more evenly as the steam flowed through the food from the base of the interior food basket from the insert basket lid.

The steam cooking apparatus as described herein may be specifically designed for microwave steam cooking and the insert basket lid. An exemplary steam cooking apparatus may be made out of a microwavable material that is suitable for cooking or heating foods in the microwave including, but not limited to, plastic, polymeric material, ceramic, glass and composites. Metal and metal alloys may not be suitable for microwave cooking. The cooking vessel as well as the insert basket and lids may be made out of microwavable material such as plastic. The insert basket lid may be a deformable material, such as plastic or a polymeric material to enable it to deform or deflect to allow release from the ratchet retainers. An exemplary microwavable steam cooking apparatus may include a microwavable material that is configured to get hot quickly in the microwave, and this microwave absorbing material may be configured in the steam cooking vessel only, or in some cases only in the base of the steam cooking vessel to heat the water quickly. An exemplary microwavable steam cooking apparatus may consist essentially of plastic, or be made substantially of plastic, wherein at least 90% by weight is plastic. An exemplary interior food basket may consist of plastic or be made substantially of plastic, wherein at least 90% by weight is plastic.

An exemplary steam cooking apparatus may have an interior volume to retain large amounts of food, such as about 5 liters or more, about 10 liters or more about 15 liters or more, about 20 liters or more and any range between and including the interior volumes provided. When the steam cooking apparatus is configured for microwave steam cooking the volume may be mush less, such as about 5 liters or less, about 4 liters or less, about 0.5 liter or more, about 1 liter or more or from about 0.5 liter to about 3 liter and any other range between and including the interior volume values provided.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
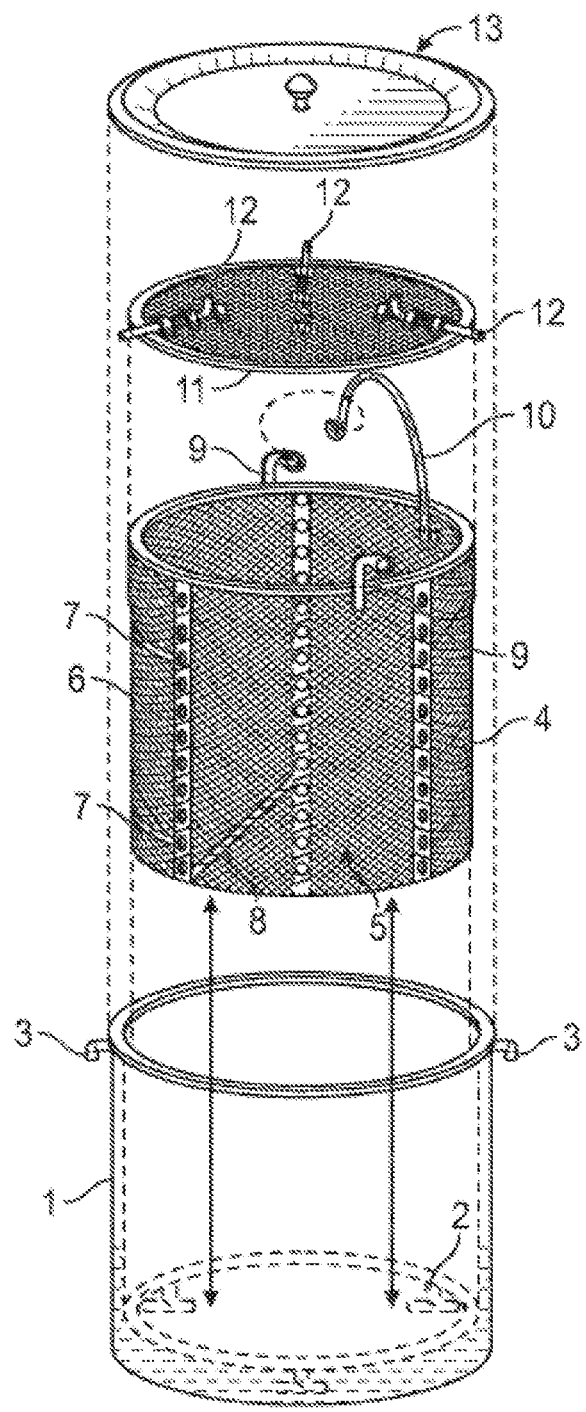
FIG. 1 is an exploded view of the cooking apparatus of present invention, and its itemized parts.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
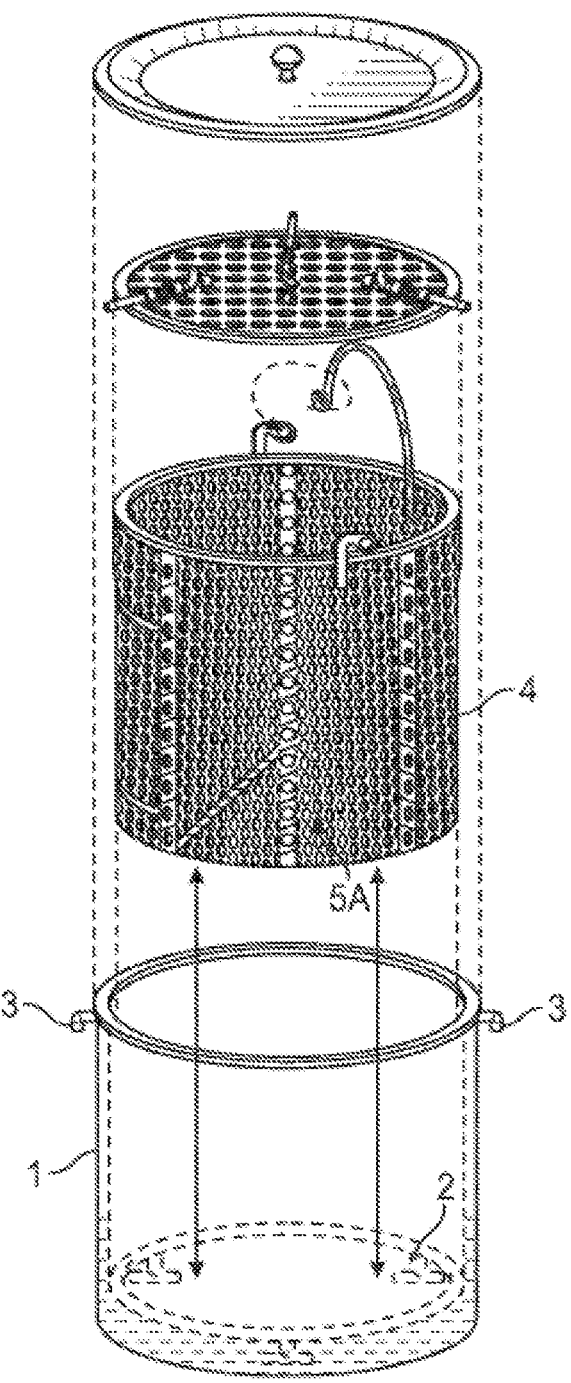
FIG. 2 is the same as FIG. 1, except the insert basket and its lid are not wire mesh.
Figure 3:
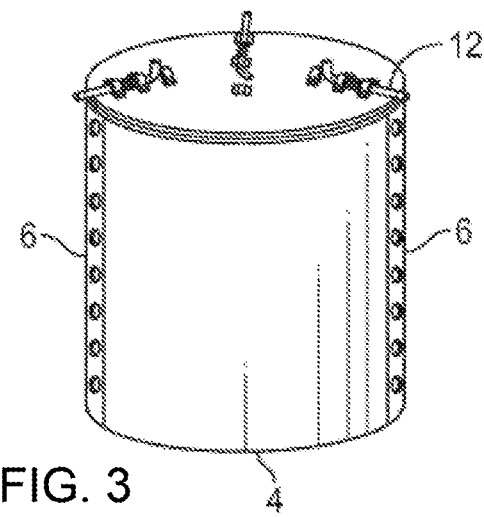
FIG. 3 illustrates the insert baskets vertically invertible design and vertically adjustable lid.
Figure 4:
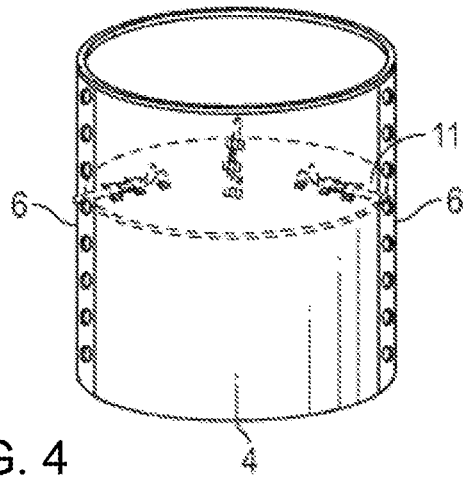
FIG. 4 illustrates the insert baskets vertically invertible design and vertically adjustable lid.
Figure 5:
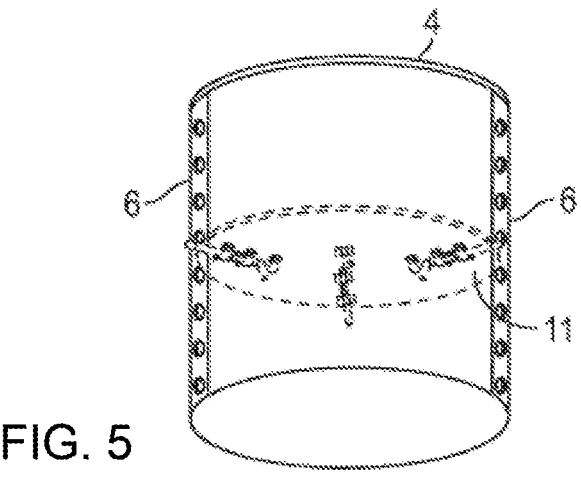
FIG. 5 illustrates the insert baskets vertically invertible design and vertically adjustable lid.

Defining the present invention in relationship to the drawings is FIG. 1 and FIG. 2, which shows the exterior circular cooking vessel or pot 1, having a bottom and vertical upwards wall, and open at the top, and handles on both sides 3. The exterior pot 1 may include alignment marks to correspond with the alignment marks of the exterior lid 13. The second component of the cooking apparatus is the pedestal 2, which is slightly smaller in circumference than the inside dimension of the pot 1 and fits inside the pot 1 and rests on the inside bottom of the pot 1. The pedestal 2 will have at least three legs or more and is use to support the insert baskets 4 above the steaming water. The top surface of the pedestal 2 is planar. The pedestal 2 may be larger or smaller in dimension than the insert basket 4 and may have three or more support wires or metal strips for structural integrity and may perhaps be similar in design as the insert basket lid 11 illustrated with FIG. 7, and basically divided into thirds where every support strip starts from the perimeter of the pedestal 2 and meets in the middle, These support strips for the pedestal 2 may extend beyond the circumference or perimeter in a planar manner and stop short of touching the inside walls of the pot 1, and are used to prevent horizontal sliding of the pedestal 2 as the insert basket 4 is placed on top.

Figure 6:
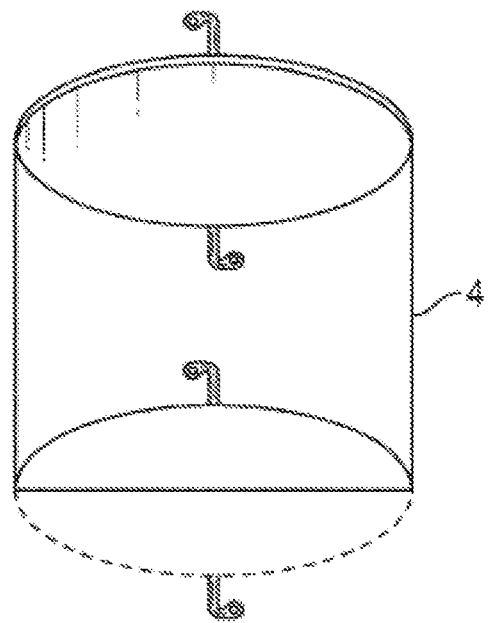
FIG. 6 illustrates the insert baskets vertically invertible design.
Figure 10:
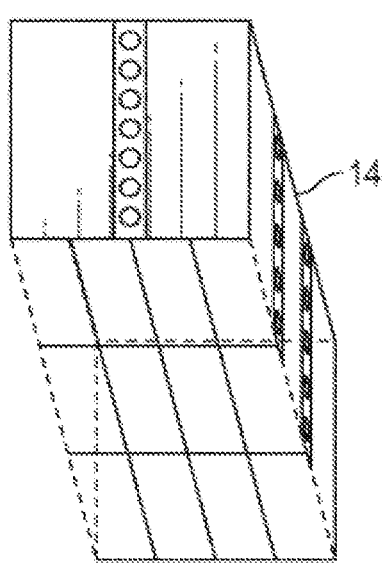
FIG. 10 is a perspective view of rectangular design steaming insert basket with reinforcements.
Figure 11:
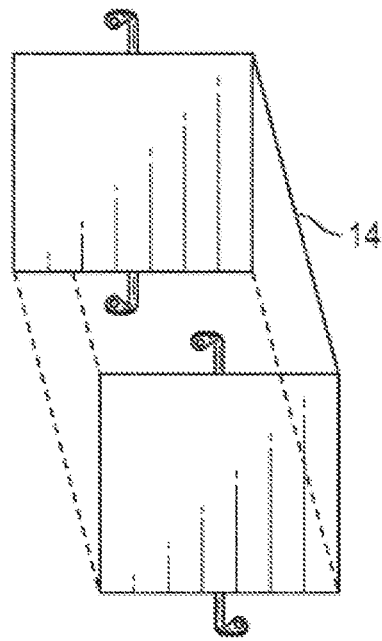
FIG. 11 is a perspective of rectangular design steaming insert basket with handle hinges.
Figure 12:
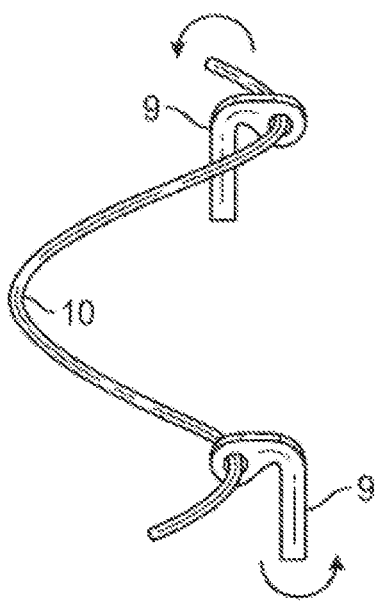
FIG. 12 illustrates steaming insert basket handle and hinges, and how handle fits underneath hinge hook as shown with counterclockwise arrow movement.
Figure 13:
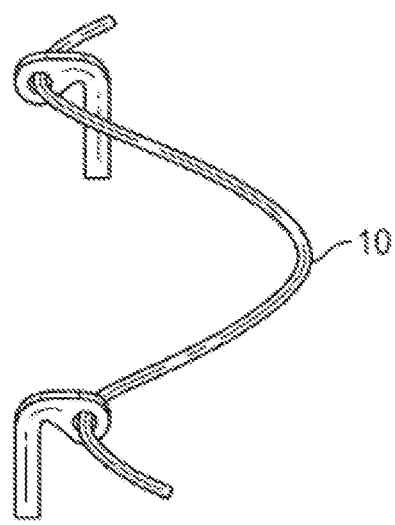
FIG. 13 illustrates steaming insert basket handle and alternative fit and usage into hinge holes.
Figure 14:
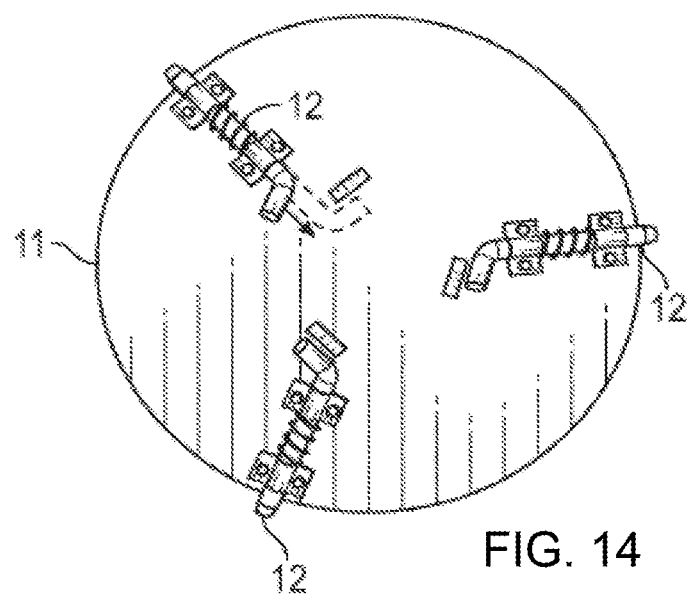
FIG. 14 shows a top view of insert basket lid with bolt latches.
Figure 15:
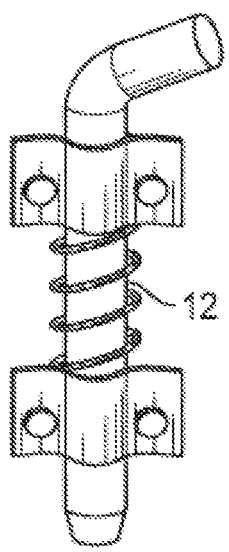
FIG. 15 shows a top view of a latch bolt.
Figure 16:
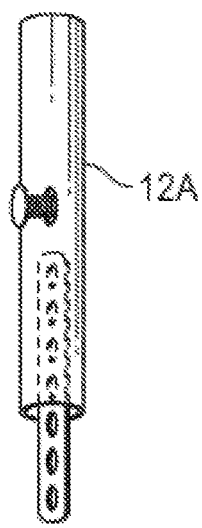
FIG. 16 shows a top view of a latch bolt.
Figure 17:
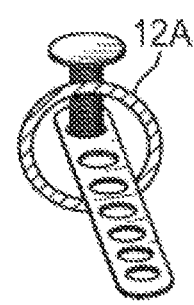
FIG. 17 shows a perspective view of a latch bolt.
Figure 18:
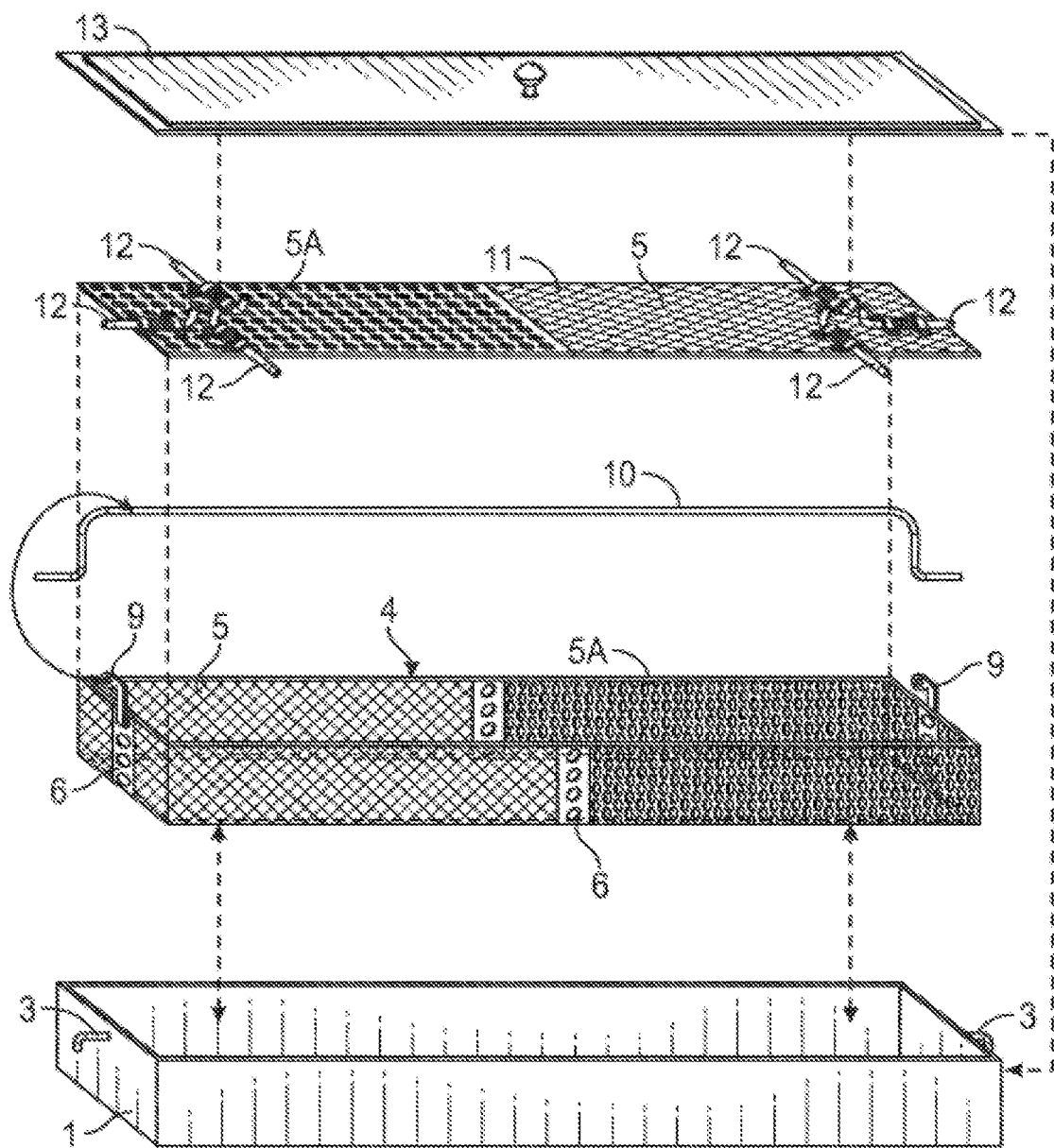
FIG. 18 is an exploded view of the cooking apparatus of present the invention.

The next component is the vertically invertible insert basket 4 which is circular in design and smaller in circumference to fit inside the pot 1, and contain the food items. These insert baskets 4 are made of either wire mesh of various gauge thickness and various apertures sizes of the mesh 5, or of metal and perhaps other suitable materials that are perforated with apertures 5A as shown in FIG. 2. The insert baskets 4 will have at least three support columns 6 to provide structural support and also serve as the latching column for the lid 11 that fits inside the insert basket 4, therefore the support columns 6 have holes that are considered latching holes, and these columns 6 continue to wrap underneath the insert basket 4 and join in the middle of the bottom of the insert basket 4, and are now only considered support brackets 8. There may also be two other support strips 7 that are parallel and a few inches above the bottom and a few inches below the top perimeters of the insert basket 4 and wrap around the entirety of the circumference of the insert basket 4. At the top rim and bottom rim of the insert basket 4 there will be four (4) lifting hinges or hooks 9, illustrated in FIGS. 6, 11, and FIG. 18, two on top and two on the bottom, and may be attached to the inside or outside wall of the insert basket 4, preferably linked to structural support strips 7, and FIGS. 10, and 14, and FIG. 18. An attached or unattached handle 10 is illustrated in FIGS. 12, 13, and is used in conjunction with the lifting hooks 9 to lift the insert basket 4 out of the pot 1. The lid 11 for the insert baskets 4 is circular in circumference and planar in design and slightly smaller in perimeter circumference than the insert baskets 4 so as to fit inside the insert baskets 4, and is vertically adjustable to move up and down the inside of the insert baskets 4. The insert lid 11 or insert basket lid 11 has on its top three or more sliding latching bolts 12 that allow the insert basket lid 11 to be latched and secured into place as the sliding latching bolts 12 inserts into the latching holes of the latching support column 6. It is this vertically adjustable insert basket lid 11 that once locked into the desired height directly above food contents that allows the insert basket 4 to become 180 degrees invertible with inside food stuff staying intact of movement, and illustrated in FIGS. 3 to 6, and FIG. 14. The insert basket lid 11 will have the same construction that matches the insert basket 4, and also illustrated in FIG. 18, either wire mesh of various gauge thickness and various apertures sizes of the mesh 5, or of metal and perhaps other suitable materials that are perforated with apertures as shown in FIG. 2, and FIG. 18, 5, 5a. FIG. 18 also illustrates the different perimeter designs the cooking vessel I may take, and the resulting associated perimeter design of invertible insert basket 4 and invertible insert basket lid 11.

Figure 7:
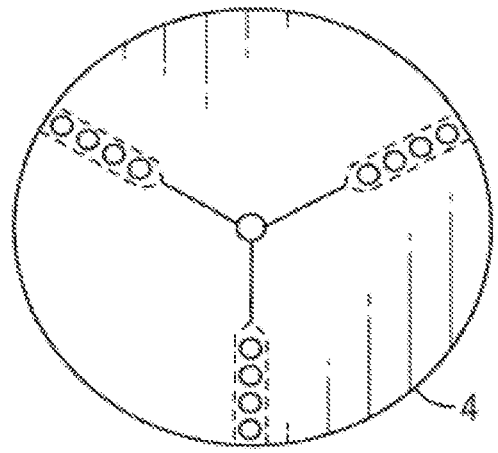
FIG. 7 is a top view illustration of an insert basket lid.

The insert basket lid 11 may also be allowed to only be vertically adjustable to a certain extent at the top of the opening of the insert basket 4 so that the latching bolts 12 do not rise above the top of the walls of the insert basket 4, thus allowing an exterior pot lid 13 to be made completely planar in design, and also means the walls of the insert basket 4 become a means of support and bearer of weight, as the insert basket lid 11 would not touch the top of the weight bearing pedestal 2 when the insert basket 4 is inverted. The insert basket lid 11 is also re-enforced with wire or metal strips and divided into thirds and attached from the perimeter of the insert basket lid 11 and meets in the middle as shown in FIG. 7. It is at the perimeter of the insert basket lid 11 where the re-enforcement wires are attached in sections of thirds that the latching bolts 12 will also be stationed for support, as once the insert basket 4 is vertically inverted the insert basket lid 11 becomes the floor and bottom of the insert basket 4, although the insert basket lid 11 is recessed as defined two sentences ago.

Figure 8:
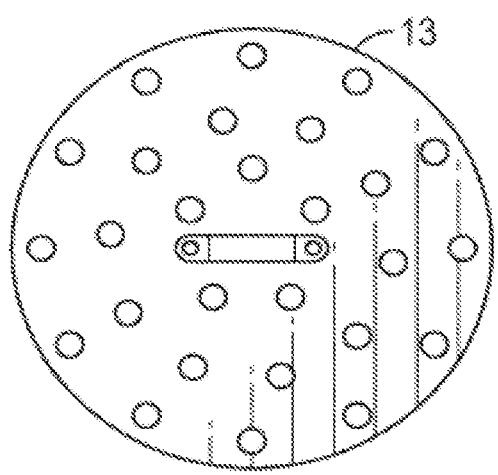
FIG. 8 is a top view illustration of an insert basket lid made of perforated metal.
Figure 9:
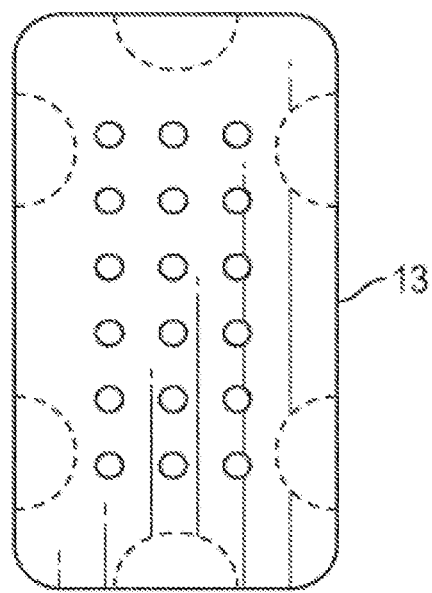
FIG. 9 is a top view illustration of rectangular design steaming insert baskets lids with perforated venting holes.

The present invention apparatus and cooking method becomes complete with the definition of the exterior pot lid 13 that fits on top of the cooking pot or vessel 1, and has a centrally located handle, which is shown but not numbered. The exterior pot lid 13 may have a 90 degree vertical wall just high enough to clear the insert basket 4 and its latching bolts 12 and then becomes planar and flat in design, hence, not a domed lid. The purpose of a non-domed lid 13 is to more quickly adjust the rising heat patterns as explained in the summary of the present invention. The exterior pot lid 13 has specific, precise, and strategically placed apertures, or vapor venting holes that are small enough to regulate and evenly distribute the constant and consistent upward flow patterns of rising vapors or steam, and these small venting holes are illustrated in FIGS. 8 and 9 are placed throughout the entirety of the exterior pot lid 13. In particular, venting holes are precisely placed so as to allow vapor venting directly above the latching bolts 12 of the insert basket lid 11. One of the apertures or venting holes of the exterior pot lid 13 may be made large enough to insert a thermometer prong, and this particular temperature aperture may remain open or covered by the user with a provided blocking shield not shown, and may perhaps be centrally located underneath the handle venting upwards through the handle where the blocking shield is also encompassed.

The present invention of cooking apparatuses is versatile in the method of thorough and even food steaming with the use of the vertically invertible steaming insert basket 4, which construction may or can be of wire mesh of various gauge thickness and various apertures sizes of the mesh 5, to not allow uncooked rice or thin pastas to fall through, and this sort of wire mesh insert basket 4 can be used without the pedestal 2 and allow the insert basket 4 to be submersed in steaming water to kick start rice and pastas to develop and then finish the cooking process using the pedestal 2 and steam or vapors.

Figure 19:
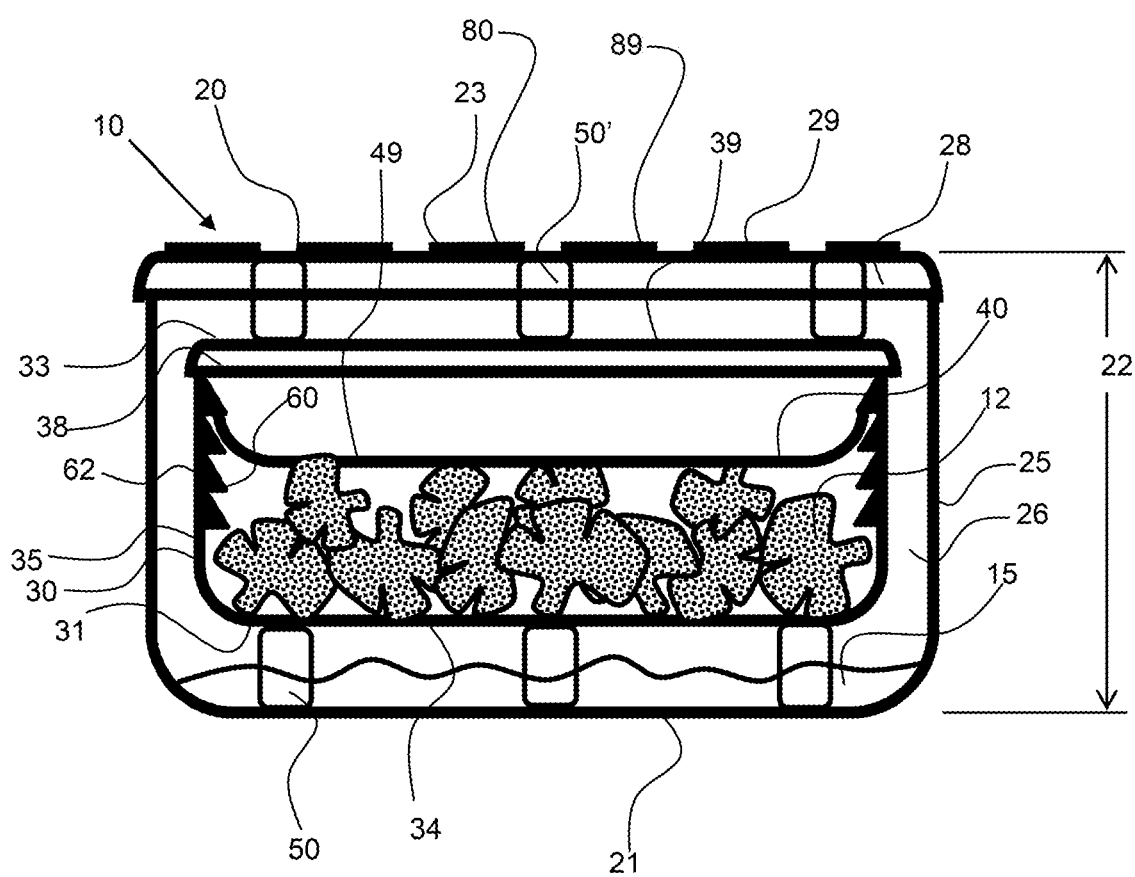
FIG. 19 shows a side view of an exemplary steam cooking apparatus with an interior food basket configured in an upright position within a steam cooking vessel.
Figure 20:
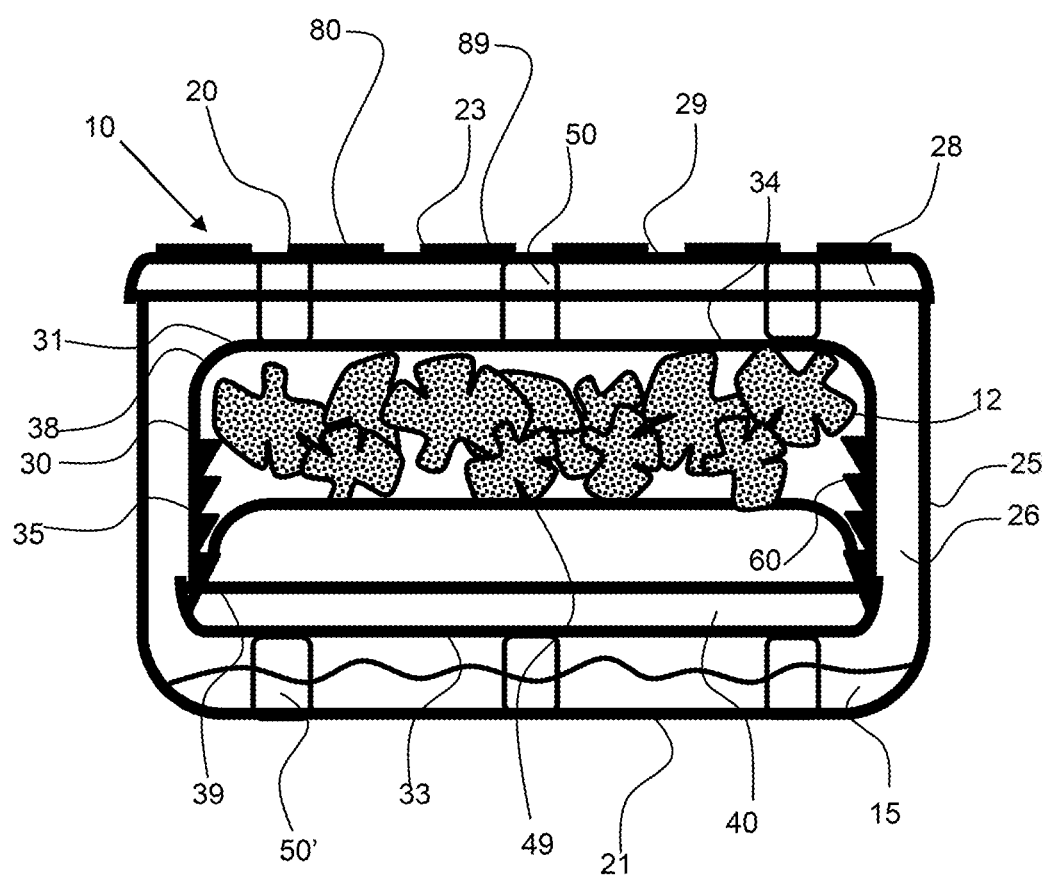
FIG. 20 shows a side view of an exemplary steam cooking apparatus with an interior food basket configured in an upside down position within a steam cooking vessel, with the basket cover proximal to the base of the cooking vessel and basket lid standoff, elevating the basket cover from the base of the cooking vessel.

Referring now to FIGS. 19 to 20, an exemplary steam cooking apparatus 10 has an interior food basket 30 configured within steam cooking vessel 20 that can be inverted, or turned upside-down, within the cooking vessel to provide even cooking of food retained therein. The steam cooking vessel 20 may retain liquid, such as water 15, in the base 21, that is converted to steam, when the steam cooking vessel is heated. The steam may pass through the interior food basket 30 and out of the lid 28 of the steam cooking vessel, which may have apertures. The interior food basket 30 has a height from the base 31 to the top 33. The steam cooking vessel has a height 22 from the base 21 to the top 23, an interior base 24, wall 25, and interior volume 26. Basket standoffs 50, such as spacers, may be configured between the interior food basket 30 and the interior base 21 of the steam cooking vessel. The standoffs may prevent the food 12 within the food basket from directly contacting the liquid water in the base of the steam cooking vessel. As described herein the standoffs may be coupled to steam cooking vessel or the interior food basket, or a separate piece that is inserted prior to inserting the interior food basket.

The interior food basket 30 is configured to secure food for steaming therein. An insert basket lid 40 is configured to be secured along the wall 35 of the interior food basket to enable various volumes of food to be retained therein. The insert basket lid has a perimeter 42 and rim extension 44 that engages with ratchet retainers 60 configured along the food basket wall 35 of the interior food basket. The insert basket lid may be pressed down into the interior basket and the rim extension, or perimeter engages with the ratchet retainer teeth 62, wherein the perimeter is retained by successive teeth that are arranged vertically along the food basket wall. The perimeter engages with a flat protrusion that extends orthogonally from the wall of the interior food basket. The insert basket lid may be removed by pressing on the center of the insert basket lid to deflect or deform it to release the perimeter extension from the ratchet retainer teeth. Alternatively, on side of the insert basket lid may be pressed down to extend the insert basket lid at an angle to release the insert basket lid from the ratchet retainers. The ratchet retainer has a plurality of ratchet retain teeth that extend inward from the interior wall 35 of the interior basket. The teeth are arranged vertically along the wall providing a plurality of engagement depths for the insert basket lid within the interior food basket.

As shown in FIG. 19, the interior food basket 30 is configured in an upright position, with the base 31 configured proximal to the base 21 of the steam cooking vessel but offset upward by the offsets 50. The interior basket has the insert basket lid 40 pushed down to retain the food 12 therein and lid 38 configured on the top 33 of the interior food basket.

As shown in FIG. 20, the interior food basket 30 has been turned upside down, or inverted within the steam cooking vessel 20. The lid 38 is now proximal the base 21 of the steam cooking vessel 20 and displace upward from the base by the offsets 50. The steam now passes through apertures in the basket cover 38, through apertures 49 in the insert basket lid 40, apertures 34 in the base 31 of the interior basket and out of apertures in the vessel lid 28.

Figure 21:
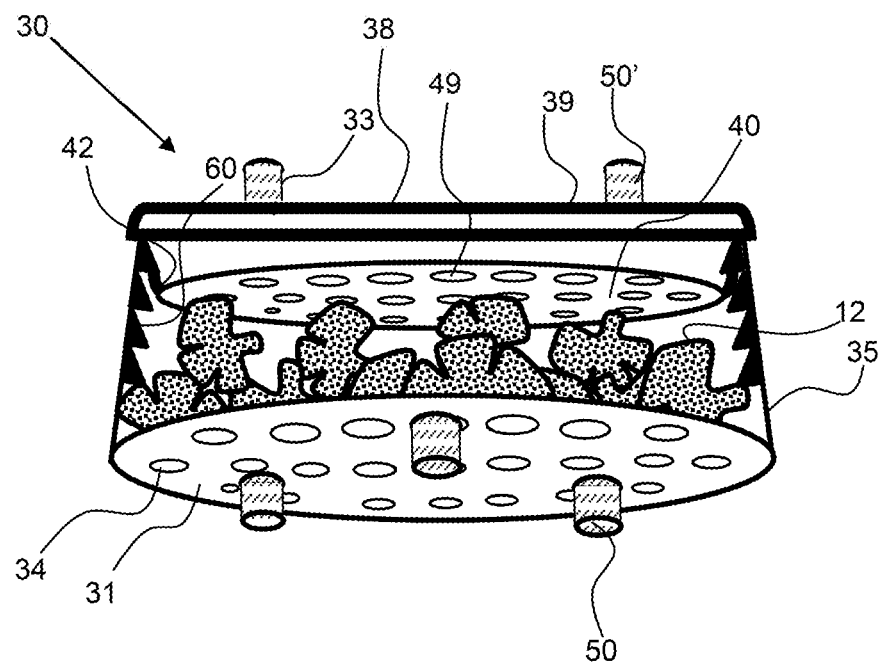
FIG. 21 shows a perspective view of an exemplary interior food basket having an insert basket lid that is adjustably engaged with the interior food basket to retain the food within the basket.

As shown in FIG. 21, an interior food basket has apertures 34 in the base 31, the basket cover 38 has apertures 39, and the insert basket lid 40 has apertures 49. All of the apertures are configured to allow steam to pass through the interior food basket to steam cook the food 12 therein. As shown in FIG. 21, standoffs 50, 50' are coupled to the base 31 and the basket cover 38, respectively. Again, the standoffs, may be coupled to the steam cooking vessel, or may be separate pieces.

Figure 22:
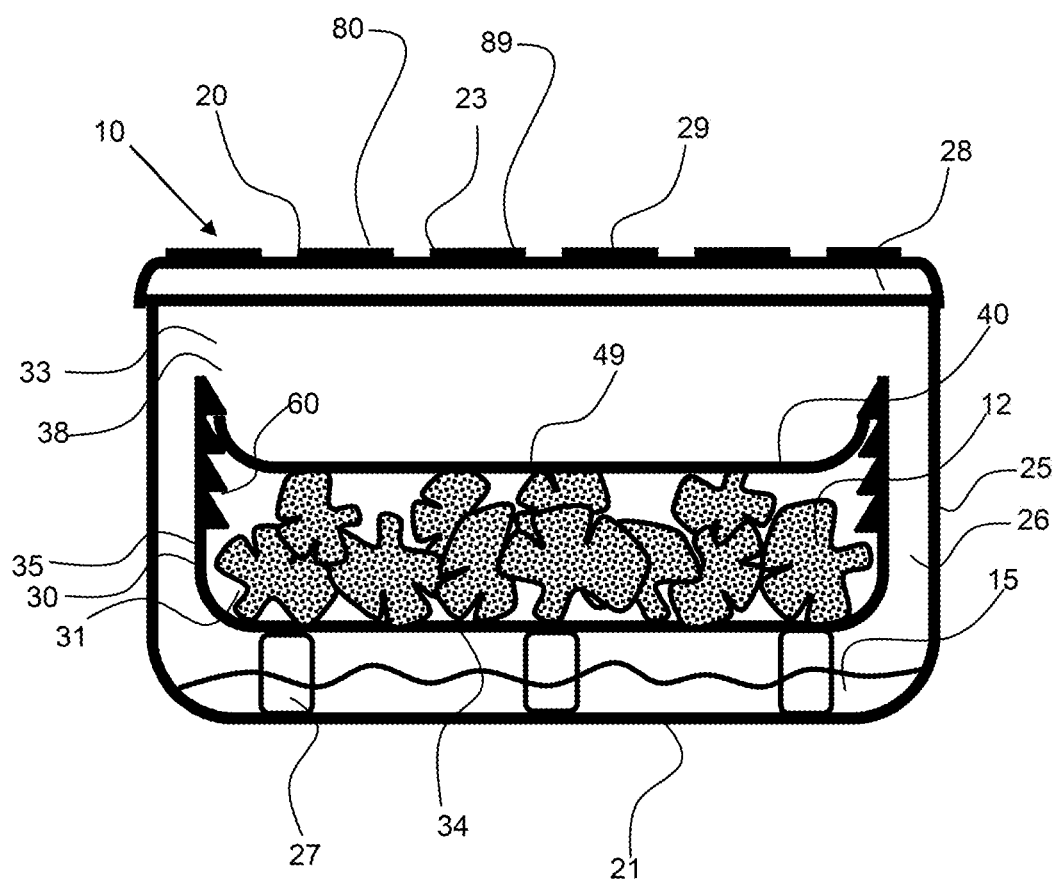
FIG. 22 shows a side view of an exemplary steam cooking apparatus with an interior food basket configured in an upright position within a steam cooking vessel with the basket cover removed.

As shown in FIG. 22, an interior food basket 30 without a lid is configured inside of a steam cooking apparatus 20 in an upright position. The basket cover is not required as the food 12 is retained within the interior food basket by the insert basket lid 40.

Figure 23:
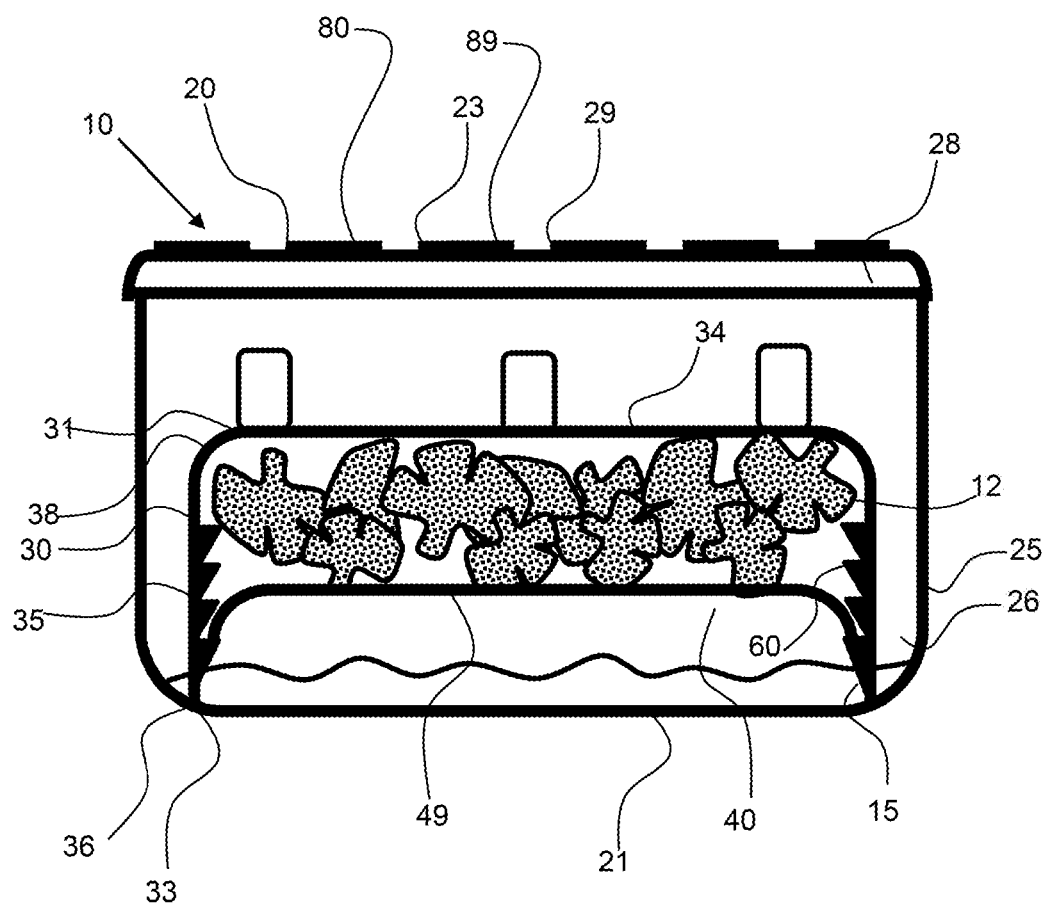
FIG. 23 shows a side view of the exemplary steam cooking apparatus shown in FIG. 22, with the interior food basket configured in an upside-down position within a steam cooking vessel.

As shown in FIG. 23, the interior food basket as shown in FIG. 22 is now inverted within the steam cooking apparatus 20. The top 33, or top rim 36 of the interior food basket provides a standoff distance of the food 12 from the water 15. Note that the standoff 50 are now extending up as they were coupled to the base 31 of the interior basket.

Figure 24:
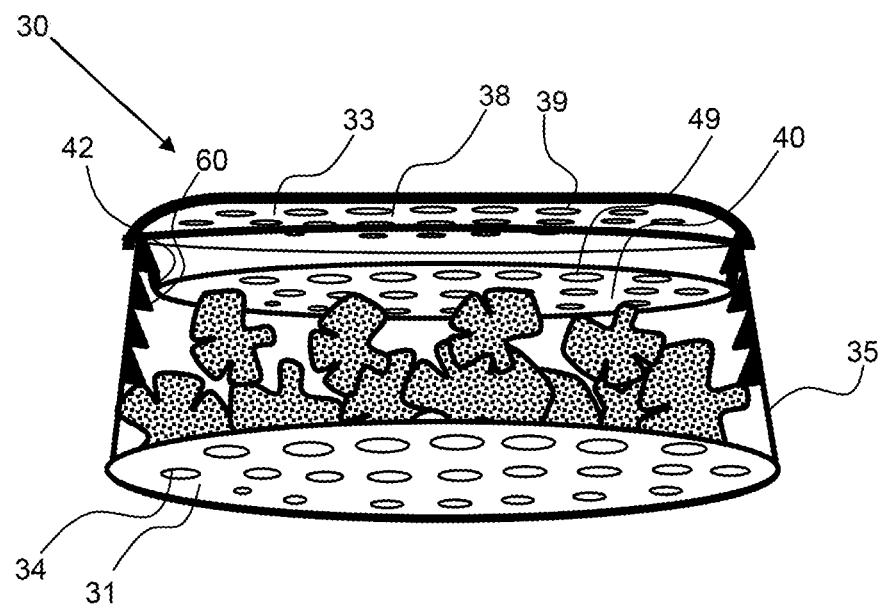
FIG. 24 shows a perspective view of an exemplary interior food basket having an insert basket lid secured in position by the ratchet retainer and a basket cover configured on interior food basket.
Figure 25:
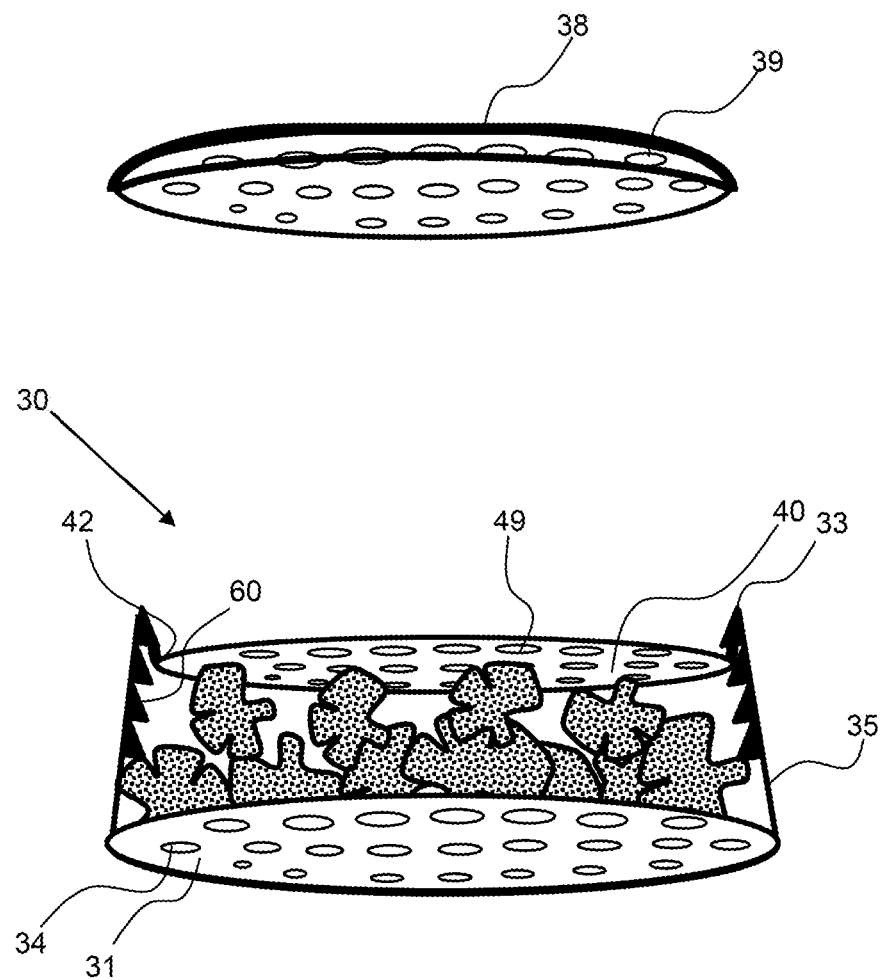
FIG. 25 shows a perspective view of an exemplary interior food basket having an insert basket lid secured in position by the ratchet retainer and the basket cover removed from the interior food basket.

Referring now FIGS. 24 and 25, an exemplary interior food basket 30 has an insert basket lid 40 secured in position by the ratchet retainer 60. The basket cover 38 is configured on interior food basket. Steam is configured to pass through apertures in the interior basket cover 38, through apertures in the insert basket lid 40, and apertures 34 in the base 31 of the interior basket. As shown in FIG. 25, the basket cover 38 is removed from the interior food basket 30. The lid may snap onto the interior food basket, for example. The interior food basket 30 has apertures 34 in the base 31, the food basket cover 38 has apertures 39, and the insert basket lid 40 has apertures 49. All of the apertures are configured to allow steam to pass through the interior food basket to steam cook the food 12 therein.

Figure 26:
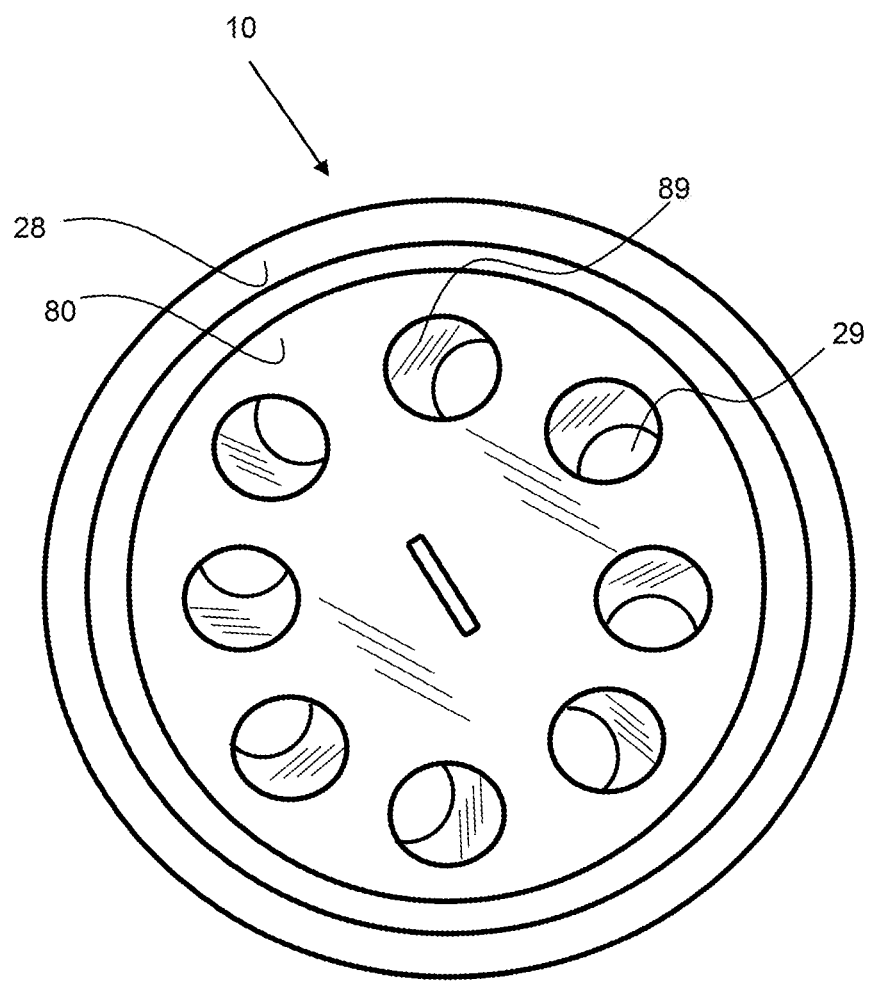
FIG. 26 shows a top view of a vessel lid and an aperture adjuster panel configured thereon.

As shown in FIG. 26, a vessel lid 28 has an aperture adjuster panel 80 configured thereon. A knob can be turned to align apertures 89 of the aperture adjuster panel with apertures 29 in the vessel lid 28. When the apertures align, a large open area is provided for steam to pass through whereas when the apertures are not aligned a smaller open area is provided for steam to pass through.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of steam cooking food comprising:
 a) providing a steam cooking apparatus comprising:
  i) a steam cooking vessel;
  ii) an interior basket configured for insertion into the cooking vessel having a plurality of venting apertures;
  iii) an insert basket lid having a plurality of venting apertures and configured for insertion into the basket and comprising a latching mechanism that is configured to secure the insert basket lid to the basket;
 b) placing water in the cooking vessel;
 c) placing said food into the basket;
 d) inserting the insert basket lid into the basket and over the food;
 e) pushing the insert basket lid down to secure the insert basket lid in a vertical position within the basket;
 f) placing the basket into the cooking vessel;

g) heating the cooking vessel to produce steam to cook the food for an initial cook time;

h) removing the interior basket from the cooking vessel after said first cook time;

i) inverting the interior basket and retaining the food therein with the insert basket lid;

j) inserting the inverted interior basket back into the cooking vessel to cook the food with the interior basket in an inverted position within the cooking vessel for a second cook time;

k) removing the interior basket; and l) removing the insert basket lid from the interior basket and the food therein.

2. The method of steam cooking food of claim 1, wherein latching mechanism comprises a ratchet retainer that secures the insert basket lid to the interior basket.

3. The method of steam cooking food of claim 2, wherein ratchet retainer comprises a plurality of ratchet teeth configured vertically along an interior wall of the interior basket.

4. The method of steam cooking food of claim 3, wherein insert basket lid comprises a rim extension that is secured in position by the ratchet teeth.

5. The method of steam cooking food of claim 3, wherein removing the insert basket lid from the interior basket comprises pressing on the insert basket lid to deflect the rim extension and release the rim extension from the ratchet teeth.

6. The method of steam cooking food of claim 1, wherein the cooking vessel has an interior base and a standoff extending from said interior base to retain the interior basket above said interior base of the cooking vessel.

7. The method of steam cooking food of claim 1, wherein the cooking vessel has an interior base, and
wherein the interior basket has a base and a standoff extending from said base to retain the interior basket above said interior base of the cooking vessel.

8. The method of steam cooking food of claim 1, wherein the cooking vessel has an interior base, and
wherein the interior basket has top rim that extends above the interior basket food lid, wherein when the interior basket is inverted, the top rim retains the interior basket food lid above said interior base of the cooking vessel to configure the food above the water in interior base of the cooking vessel.

9. The method of steam cooking food of claim 1, method wherein the steam cooking apparatus is made of a microwaveable material.

10. The method of steam cooking food of claim 1, wherein the steam cooking apparatus is made of a plastic material.

11. A steam cooking apparatus comprising:
a) a steam cooking vessel;
b) an interior basket configured for insertion into the cooking vessel having a plurality of venting apertures;
c) an insert basket lid having a plurality of venting apertures and configured for insertion into the basket and comprising a latching mechanism that is configured to secure the insert basket lid to the basket.

12. The steam cooking apparatus of claim 11, wherein latching mechanism comprises a ratchet retainer that secures the insert basket lid to the interior basket.

13. The steam cooking apparatus claim 12, wherein ratchet retainer comprises a plurality of ratchet teeth configured vertically along an interior wall of the interior basket.

14. The steam cooking apparatus claim 13, wherein insert basket lid comprises a rim extension that is secured in position by the ratchet teeth.

15. The steam cooking apparatus 14, wherein the insert basket lid is plastic and deformable, whereby removing the insert basket lid from the interior basket is enabled by pressing on the insert basket lid to deform the rim extension and release the rim extension from the ratchet teeth.

16. The steam cooking apparatus of claim 11, wherein the cooking vessel has an interior base and a standoff extending from said interior base to retain the interior basket above said interior base of the cooking vessel.

17. The steam cooking apparatus claim 11, wherein the cooking vessel has an interior base, and
wherein the interior basket has a base and a standoff extending from said base to retain the interior basket above said interior base of the cooking vessel.

18. The steam cooking apparatus claim 11, wherein the cooking vessel has an interior base, and
wherein the interior basket has top rim that extends above the interior basket food lid, wherein when the interior basket is inverted, the top rim retains the interior basket food lid above said interior base of the cooking vessel to configure the food above the water in interior base of the cooking vessel.

19. The steam cooking apparatus claim 11, wherein the steam cooking apparatus is made of a microwaveable material.

20. The steam cooking apparatus claim 11, wherein the steam cooking apparatus is made of a plastic material.

* * * * *